United States Patent
Vijaya Kumar et al.

(10) Patent No.: US 10,094,906 B2
(45) Date of Patent: Oct. 9, 2018

(54) VEHICLE POSITIONING SYSTEM USING V2X, SENSOR, AND GNSS INFORMATION

(71) Applicant: GM GLOBAL TECHNOLOGY OPERATIONS LLC, Detroit, MI (US)

(72) Inventors: Vivek Vijaya Kumar, Shelby Township, MI (US); Hariharan Krishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 173 days.

(21) Appl. No.: 15/387,752

(22) Filed: Dec. 22, 2016

(65) Prior Publication Data

US 2018/0180708 A1 Jun. 28, 2018

(51) Int. Cl.
*G06F 19/00* (2018.01)
*G01S 5/02* (2010.01)
*G01S 19/42* (2010.01)

(52) U.S. Cl.
CPC ............ *G01S 5/0284* (2013.01); *G01S 19/42* (2013.01)

(58) Field of Classification Search
CPC ............................... G01S 5/0284; G01S 19/42
See application file for complete search history.

(56) References Cited

U.S. PATENT DOCUMENTS

| | | | |
|---|---|---|---|
| 6,658,336 B2 | 12/2003 | Browne | |
| 6,812,832 B2 | 11/2004 | Lobaza | |
| 7,444,241 B2 | 10/2008 | Grimm | |
| 7,797,108 B2 | 9/2010 | Grimm | |
| 7,920,969 B2 | 4/2011 | Mudalige | |
| 8,355,852 B2 | 1/2013 | Grimm | |
| 2006/0106538 A1 | 5/2006 | Browne | |
| 2008/0046150 A1* | 2/2008 | Breed | B60R 21/0134 701/45 |
| 2009/0062986 A1* | 3/2009 | Simmons | B62D 1/28 701/41 |
| 2009/0140887 A1* | 6/2009 | Breed | G01C 21/165 340/990 |
| 2011/0161032 A1 | 6/2011 | Stahlin | |
| 2013/0060461 A1* | 3/2013 | Wong | B66F 9/063 701/408 |
| 2013/0093618 A1 | 4/2013 | Oh | |
| 2013/0107219 A1* | 5/2013 | Feldmann | G01C 21/24 353/11 |
| 2014/0074342 A1* | 3/2014 | Wong | G05D 1/0274 701/26 |
| 2015/0127239 A1* | 5/2015 | Breed | B60R 21/0132 701/70 |
| 2015/0127250 A1* | 5/2015 | Kim | G01S 19/48 701/468 |
| 2015/0149083 A1 | 5/2015 | Lee | |
| 2015/0153178 A1 | 6/2015 | Koo | |

* cited by examiner

*Primary Examiner* — Ian Jen

(57) ABSTRACT

A method includes identifying a reference target with both a vehicle sensor and an infrastructure position signal. A position of a host vehicle with respect to the reference target is then determined. A localized position error between the host vehicle position and the determined position with respect to the object is then calculated with a vehicle controller. Finally, a vehicle positioning system is compensated to account for the localized position error.

20 Claims, 3 Drawing Sheets

VEHICLE POSITIONING SYSTEM USING V2X, SENSOR, AND GNSS INFORMATION

FIELD

The present disclosure relates to a vehicle positioning system using V2X, sensor, and GNSS information and, more particularly, to a system for positively assessing the distance between the object and the vehicle and using that information for improving the accuracy of a Vehicle Positioning System.

INTRODUCTION

The statements in this section merely provide background information related to the present disclosure and may not constitute prior art.

The Global Navigation Satellite System (GNSS) is a space-based satellite navigation system that provides location and time information to remote devices (e.g., receivers) located anywhere on or near the Earth. Most GNSS receivers have a typical kilometric error in positioning which ranges from about 5 to 15 meters and up to 30 meters in some instances (e.g., under tree cover, in an urban environment). Thus, the degree of accuracy for these systems is not as proficient as most automotive manufactures would like in order to provide a high degree of accuracy as to the vehicle's current location. This positioning error can affect autonomous driving systems and also affect the performance of safety systems.

To obviate the known errors from the data received by the GNSS receiver, various devices and methods have been used. In one example, a high performance GNSS receiver and antenna can be implemented, but at a high cost. In another example, corrections to the data received from the GNSS receiver can be made based on real-time correction messages (RTCM), but not all GNSS receivers support RTCM and RTCM requires frequent updates in real-time.

SUMMARY

A method includes identifying a reference target with both a vehicle sensor and an infrastructure position signal. A position of a host vehicle with respect to the reference target is then determined. A localized position error between the host vehicle position and the determined position with respect to the object is then calculated with a vehicle controller. Finally, a vehicle positioning system is compensated to account for the localized position error.

A vehicle positioning system includes a first computing device configured to receive dynamics data and sensor object data from a host vehicle. Furthermore, a receiving device is configured to receive real time object position data from a reference target. Finally, a second computing device is configured to compare data from the first computing device and the receiving device and to run an error function. The second computing device is configured to calibrate the vehicle positioning system when the error function has a value other than zero.

A method includes identifying a reference target with both a vehicle sensor and an infrastructure position signal. A vehicle controller then determines that the vehicle sensor and the infrastructure position signal are identifying the same reference target. The vehicle controller next calculates a localized position error between the host vehicle position and the localized position determined using the reference target based on at least data received from the vehicle sensor and the infrastructure position signal. Finally, a vehicle positioning system is compensated to account for the localized position error.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
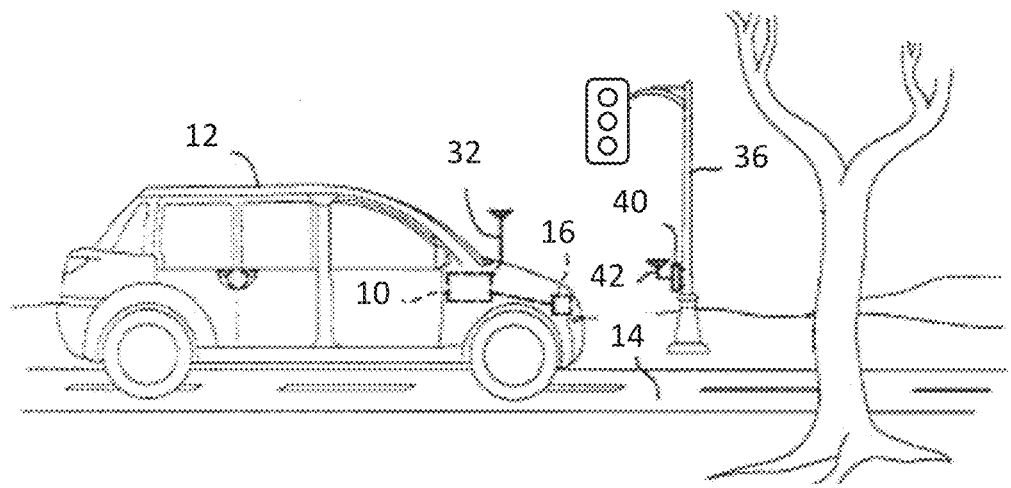
FIG. 1 is a schematic view of an exemplary host vehicle approaching a reference target according to the present disclosure.

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be modified in alternate applications.

Figure 2:
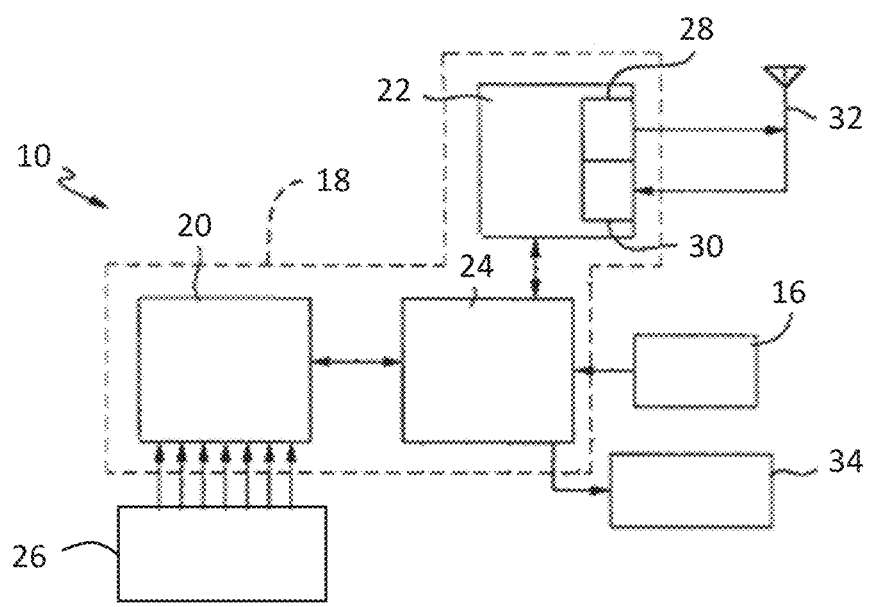
FIG. 2 is a block diagram of a basic hardware system for use with the host vehicle of FIG. 1.

Referring now to FIG. 1, an exemplary hardware system 10 for calibrating a vehicle positioning system (i.e., VPS 34, as shown in FIG. 2) and improving VPS accuracy is provided within a host vehicle 12. The host vehicle 12 includes the system 10 onboard as the host vehicle 12 travels along a drive path 14. The system 10 is attachable to and/or integral with the structure of the host vehicle 12.

With reference now to FIG. 2, the hardware system 10 includes a position sensor 16 and a controller 18. The position sensor 16 is utilized to determine the real time position of an object relative to the vehicle. Although other conventional types of sensors may be used, the sensor 16 is preferably either an electromagnetic radar type sensor, a laser radar type sensor, or merely a pulsed infrared laser type sensor. The sensor 16 is preferably situated at or near the lateral perimeter of the vehicle 12 to thereby facilitate optimal line-of-sight position sensing when an object comes close to the vehicle perimeter. Although only one position sensor 16 is illustrated in FIG. 1, it is to be understood that multiple position sensors may be situated at various points along the perimeter of the vehicle 12 to thereby facilitate the sensing of an object approaching from any direction.

Further in FIG. 2, the controller 18 includes a first computing device 20, a transmitting/receiving (T/R) device 22, and a second computing device 24. The first computing device 20 is dedicated to processing dynamics data 26 for the vehicle. Such dynamics data 26 may include, for example, real time data concerning the speed level, the acceleration rate, the yaw rate, the steering wheel position, the brake position, the throttle position, and/or the transmission gear position of the vehicle. Such real time data is communicated from various vehicle sensors and/or systems (not shown) to the first computing device 20 via electrical conductor connections.

The T/R device 22 of the controller 18 includes both a transmitter 28 and a receiver 30, which are electrically connected to a directional-type antenna 32. The transmitter 28 and receiver 30 may be a wideband radio-frequency type transmitter/receiver capable of transmitting and receiving, via the antenna 32, electromagnetic radio-frequency (RF) signals over a wide band of signal frequencies. The directional antenna 32 is used for both directing and transmitting an electromagnetic radio-frequency signal to the object and also for receiving a signal from the object. The directional antenna 32 produces a radiation pattern which is directed toward the object. It is to be understood, however, that two separate antennas, one dedicated for directional transmission and one dedicated for receiving, may alternatively be used instead of the single directional antenna 32.

The second computing device 24 of the controller 18 is dedicated to comparing the values from the first computing device 20 and the T/R device 22 and to calculating an error function, when necessary. To facilitate such comparing and calculating, the second computing device 24 is electrically connected to the first computing device 20, to both the transmitter 28 and the receiver 30 of the T/R device 22, and to the position sensor 16 via respective electrical conductor connections. The second computing device 24 can, in turn, use the calculated localized positioning error to calibrate the VPS 34 to compensate for the error, as will be described in further detail below.

Figure 3:
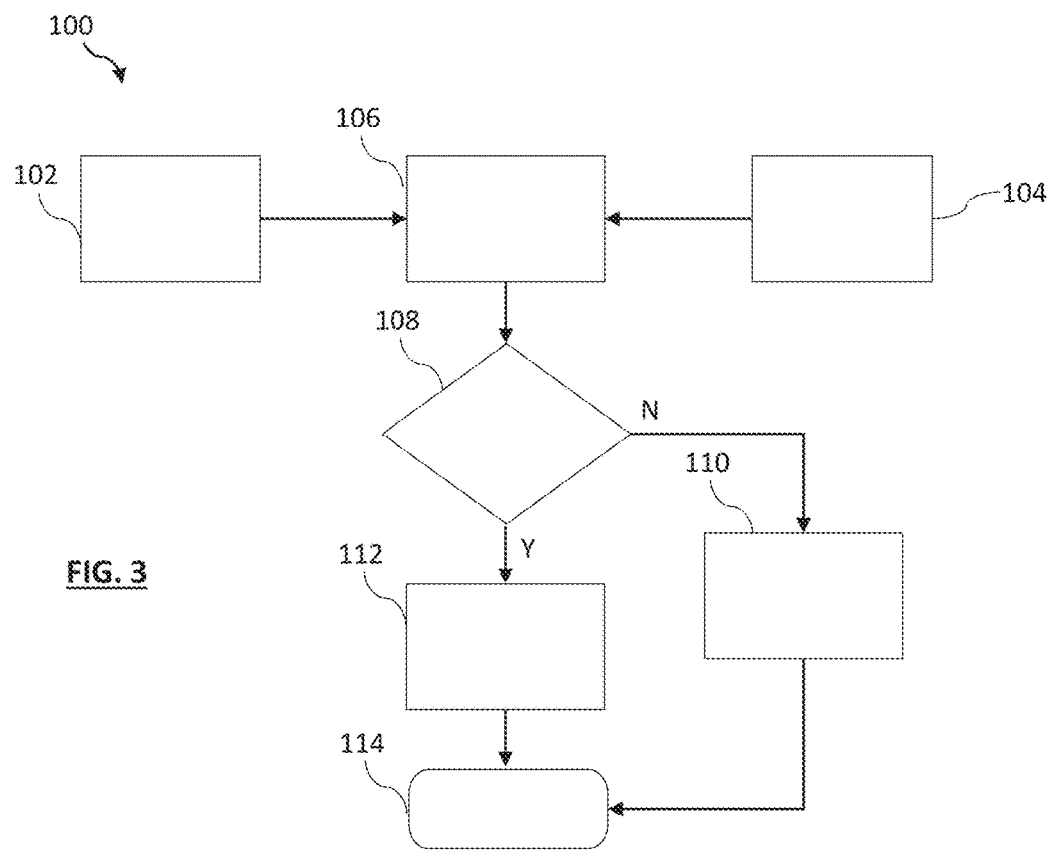
FIG. 3 is a flow diagram of a method for calculating and correcting a positional error of the of host vehicle of FIG. 1.

With reference to FIG. 3 and continued reference to FIG. 1, the host vehicle 12 may approach and identify reference target objects common to V2X (i.e., vehicle-to-infrastructure, vehicle-to-vehicle, vehicle-to-environment) and sensor systems according to an operation 100. The reference target object in this particular case is, for example, a traffic signal post 36, but it should be understood that the reference target object can be any type of target object, such as, stop signs, lamp posts, buildings, etc.

With regard to the traffic signal post 36, an active transponder 40 with an antenna 42 may be situated and mounted on the traffic signal post 36. The transponder 40 is typically a small microprocessor device having a receiver circuit and a transmitter circuit electrically connected to the antenna 42. Except for the antenna 42, the microprocessor device of the transponder 40 is enclosed within a small protective box or container mounted on the traffic signal post 36. Although the microprocessor device may operate with electrical power derived from the same power source used to illuminate the lamp light in the traffic signal post 36, the microprocessor device is preferably powered by rechargeable batteries which are periodically charged with an external energy collector such as, for example, a solar collector.

The operation 100 may begin with either a V2X input initiation (Step 102) or a sensor input initiation (Step 104). With respect to the V2X initiation, the transponder 40 may provide the exact location of the reference target (i.e., traffic signal post 36) and may transmit this information via the antenna 42 to the host vehicle 12 at the receiver 30 of the T/R device 22. With respect to the sensor initiation, the position sensor 16 may sense the real time position of the reference target (i.e., traffic signal post 36) relative to the host vehicle 12 and communicate the sensed real time object position data to the second computing device 24 of the controller 18.

In particular, when the host vehicle 12 is following the drive path 14 and approaches the traffic signal post 36 such that the traffic signal post 36 comes within a predetermined sensing range (for example, 20 meters) of the antenna 32 onboard the host vehicle 12, the antenna 32 will receive the information transmitted from the transponder 40. This information will be relayed from the T/R device 22 to the second computing device 24. At generally the same time, relevant real time vehicle dynamics data 26 from the first computing device 20 is communicated to the second computing device 24, as well. Furthermore, the position sensor 16 onboard the host vehicle 12 will sense the relative location of the reference target relative to the host vehicle 12 and communicate relative object position data to the second computing device 24 of the controller 18.

Using both the real time object position data (i.e., from the transponder 40), the real time vehicle dynamics data 26, and the relative object position data (i.e., from the position sensor 16), the second computing device 24 then determines the position of the vehicle 12. In particular, in Step 106, the second computing device 24 compares the V2X input and the sensor input data. If a match is not found in Step 108 (i.e., the relative object position data identifies a different object than that of the real time object position data), then the host vehicle position as reported by the Global Navigation Satellite System (GNSS) is used to identify the location of the host vehicle 12 (Step 110) in the VPS 34 and the process is ended (Step 114). If, however, a match is found in Step 108 (i.e., the relative object position data identifies a similar object than that of the real time object position data), then an error function 150 initiates in Step 112.

Figure 4:
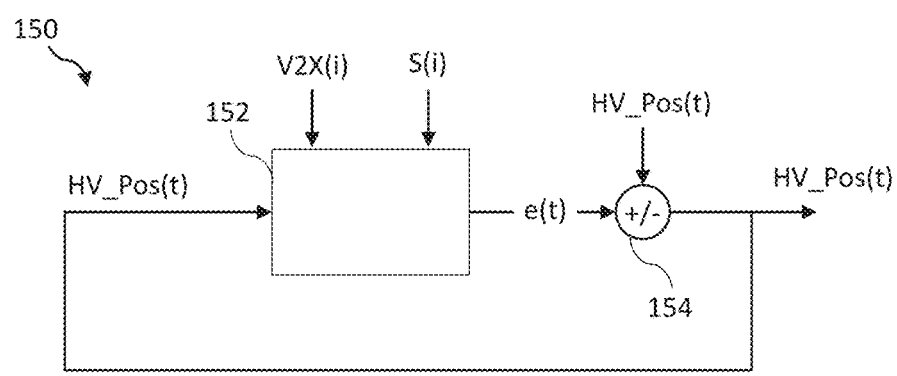
FIG. 4 is a flow diagram of an error function for use in the method of FIG. 3.

Referring now to FIG. 4, when the error function 150 is initiated, various inputs are sent to the second computing device 24 in order to calculate a positional error of the host vehicle 12 (e.g., e(t)). As an example, the second computing device 24 receives the V2X inputs (e.g., V2X(i)), the sensor inputs (e.g., S(i)), and the host vehicle position (e.g., HV_Pos(t)). The second computing device 24 aggregates the various data and calculates the positional error or 3-D offset from the reference target in Step 152. The positional error is then applied to the host vehicle position in order to calibrate the VPS 34 to compensate for the error (Step 154). The output of the updated host vehicle position ends the process in FIG. 3, as well (Step 114).

In addition to the particular exemplary scenario described hereinabove with regard to FIG. 1, it is to be understood that any reference target having any suitable type of conventional transponder, either active or passive, or conventional reflector may be situated on a particular object and thereby serve as a means for identifying the object to a host vehicle pursuant to the present invention.

Figure 5:
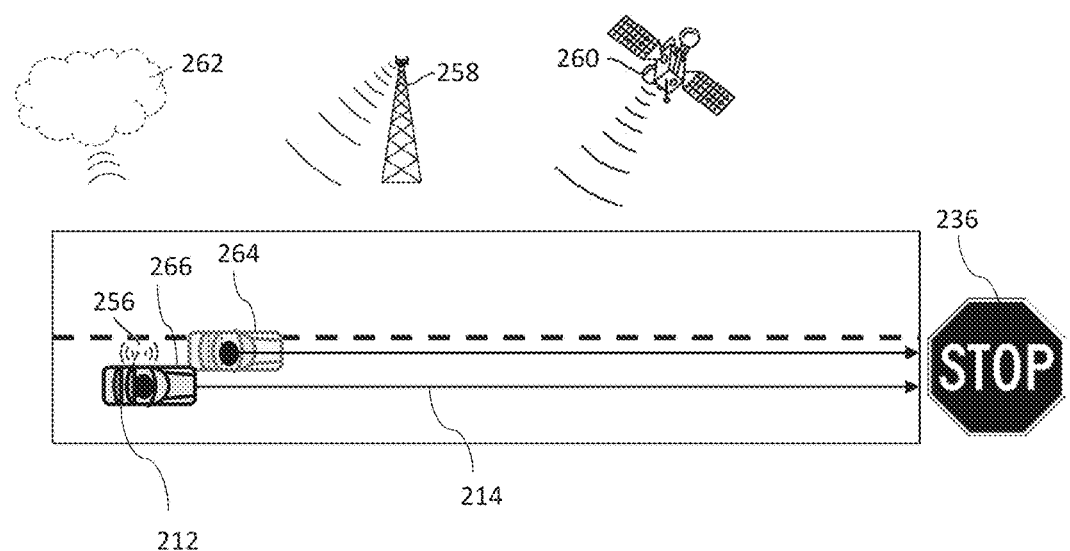
FIG. 5 is another schematic view of an exemplary host vehicle approaching a reference target according to the present disclosure.

Furthermore, and as a secondary example described with respect to FIG. 5, a host vehicle 212 may travel along a drive path 214 towards a stationary reference object (e.g., stop sign 236). The position of the host vehicle 212 with respect to the stop sign 236 may be obtained through the GNSS information and via communication between a V2X communications device 256 and other external sources (e.g., with V2X communications devices located on other vehicles (not shown), with a remote wireless communications system 258, and/or with a remote satellite system 260). The operation for calculating the positional error to the stop sign 236 may be substantially similar to the operation 100, but for the fact that the error calculations and compensation moves from a localized computation to a computation completed in a cloud-based computing device 262. As such, the host vehicle position may be understood to reflect position 264, when in actuality, the host vehicle 212 may be truly located at position 266.

Embodiments of the present disclosure are described herein. This description is merely exemplary in nature and, thus, variations that do not depart from the gist of the disclosure are intended to be within the scope of the disclosure. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. A method comprising:
    identifying a reference target with both a vehicle sensor and an infrastructure position signal;
    determining a position of a host vehicle with respect to the reference target;
    calculating a localized position error between the host vehicle position and the determined position with respect to the reference target with a vehicle controller; and
    compensating a vehicle positioning system to account for the localized position error.

2. The method of claim 1, wherein the infrastructure position signal is transmitted from the reference target to an on-vehicle transmitting/receiving device.

3. The method of claim 1, further comprising:
    obtaining vehicle positioning data from both the vehicle sensor and the infrastructure position signal; and
    comparing the vehicle positioning data from the vehicle sensor to that of the vehicle positioning data from the infrastructure position signal.

4. The method of claim 3, further comprising:
    selecting vehicle positioning data from a global navigation satellite system when the vehicle positioning data from the vehicle sensor is different from that of the vehicle positioning data from the infrastructure position signal.

5. The method of claim 3, further comprising:
    performing an error function when the vehicle positioning data from the vehicle sensor is the same as that of the vehicle positioning data from the infrastructure position signal.

6. The method of claim 5, wherein the error function identifies the localized position error between the host vehicle position and the localized position determined using the reference target in a three-dimensional space.

7. A vehicle positioning system, comprising:
    a first computing device configured to receive dynamics data and sensor object data from a host vehicle;
    a receiving device configured to receive real time object position data from a reference target; and
    a second computing device configured to compare data from the first computing device and the receiving device and to run an error function, wherein the second computing device is configured to calibrate the vehicle positioning system when the error function has a value other than zero.

8. The vehicle positioning system of claim 7, wherein the dynamics data includes one of a vehicle speed level, a vehicle acceleration rate, a vehicle yaw rate, a vehicle steering wheel position, a vehicle brake position, a vehicle throttle position, and a vehicle transmission gear position.

9. The vehicle positioning system of claim 7, wherein the dynamics data is communicated to the first computing device via a vehicle sensor.

10. The vehicle positioning system of claim 7, wherein the receiving device is interconnected with an antenna configured to receive an electromagnetic radio-frequency signal from the reference target.

11. The vehicle positioning system of claim 10, wherein the electromagnetic radio-frequency signal includes at least the real time object position data.

12. The vehicle positioning system of claim 7, wherein the second computing device further determines if the data from the first computing device and the receiving device identify the same object.

13. The vehicle positioning system of claim 12, wherein the second computing device selects vehicle positioning data from a global navigation satellite system when the data from the first computing device identifies a different object from that of the receiving device.

14. The vehicle positioning system of claim 12, wherein the second computing device performs an error function when the data from the first computing device identifies a same object from that of the receiving device.

15. The vehicle positioning system of claim 14, wherein the error function identifies a localized position error between the host vehicle and the reference target in a three-dimensional space.

16. The vehicle positioning system of claim 15, wherein the localized position error is applied to the vehicle positioning data.

17. A method comprising:
    identifying a reference target with both a vehicle sensor and an infrastructure position signal;
    determining, with a vehicle controller, that the vehicle sensor and the infrastructure position signal are identifying the same reference target;
    calculating, in the vehicle controller, a localized position error between the host vehicle position and the localized position determined using the reference target based on at least data received from the vehicle sensor and the infrastructure position signal; and
    compensating a vehicle positioning system to account for the localized position error.

18. The method of claim 17, wherein the infrastructure position signal is transmitted from the reference target to an on-vehicle transmitting/receiving device.

19. The method of claim 17, wherein when the vehicle controller determines that the vehicle sensor and the infrastructure position signal are identifying different reference targets, further comprising:
    selecting vehicle positioning data from a global navigation satellite system.

20. The method of claim 17, wherein the localized position error between the host vehicle and the reference target is identified in a three-dimensional space.

* * * * *